United States Patent
Wityak

(10) Patent No.: US 7,572,517 B2
(45) Date of Patent: Aug. 11, 2009

(54) REFLECTIVE OR SEMI-REFLECTIVE METAL ALLOY COATINGS

(75) Inventor: George M. Wityak, Albuquerque, NM (US)

(73) Assignee: Target Technology Company, LLC, Irvine, CA (US)

( * ) Notice: Subject to any disclaimer, the term of this patent is extended or adjusted under 35 U.S.C. 154(b) by 146 days.

(21) Appl. No.: 11/032,636

(22) Filed: Jan. 10, 2005

(65) Prior Publication Data

US 2006/0165943 A1    Jul. 27, 2006

Related U.S. Application Data

(63) Continuation-in-part of application No. 10/616,478, filed on Jul. 8, 2003.

(60) Provisional application No. 60/394,587, filed on Jul. 8, 2002, provisional application No. 60/614,881, filed on Sep. 29, 2004, provisional application No. 60/535,675, filed on Jan. 8, 2004.

(51) Int. Cl.
    *B32B 9/00* (2006.01)
(52) U.S. Cl. ...................... 428/457; 428/64.4
(58) Field of Classification Search ................. 428/457, 428/64.1, 425.9, 64.4, 64.5; 430/270
    See application file for complete search history.

(56) References Cited

U.S. PATENT DOCUMENTS

| | | | |
|---|---|---|---|
| 3,379,579 A | 4/1968 | Rapp et al. | |
| 4,241,129 A | 12/1980 | Marton et al. | |
| 4,370,391 A | 1/1983 | Mori et al. | |
| 4,404,656 A | 9/1983 | Cornet | |
| 4,405,994 A | 9/1983 | Cornet et al. | |
| 4,450,553 A | 5/1984 | Holster et al. | |
| 4,519,065 A | 5/1985 | Lewis et al. | |
| 4,610,771 A | 9/1986 | Gillery | |
| 4,709,363 A | 11/1987 | Dirks et al. | |
| 4,737,934 A | 4/1988 | Ross et al. | |
| 4,743,526 A | 5/1988 | Ando et al. | |
| 4,998,239 A | 3/1991 | Strandjord et al. | |
| 5,016,240 A | 5/1991 | Strandjord et al. | |
| 5,090,009 A | 2/1992 | Hamada et al. | |
| 5,093,174 A | 3/1992 | Suzuki et al. | |
| 5,139,890 A | 8/1992 | Cowie et al. | |
| 5,171,392 A | 12/1992 | Iida et al. | |
| 5,302,493 A | 4/1994 | Strandjord et al. | |
| 5,304,440 A | 4/1994 | Ono et al. | |
| 5,325,351 A | 6/1994 | Uchiyama et al. | |
| 5,415,914 A | 5/1995 | Arioka et al. | |
| 5,419,939 A | 5/1995 | Arioka et al. | |
| 5,498,507 A | 3/1996 | Handa et al. | |
| 5,523,140 A * | 6/1996 | Tominaga et al. | 428/64.1 |
| 5,620,767 A | 4/1997 | Harigaya et al. | |
| 5,637,371 A * | 6/1997 | Tominaga et al. | 428/64.1 |
| 5,640,382 A | 6/1997 | Florczak et al. | |
| 5,641,606 A | 6/1997 | Suzuki et al. | |
| 5,753,413 A | 5/1998 | Nishida et al. | |
| 5,811,217 A | 9/1998 | Akahira et al. | |
| 5,820,994 A | 10/1998 | Gotoh et al. | |
| 5,853,872 A | 12/1998 | Shimamori et al. | |
| 5,864,419 A | 1/1999 | Lynam | |
| 5,948,497 A | 9/1999 | Hatwar et al. | |
| 6,004,646 A | 12/1999 | Ohno et al. | |
| 6,007,887 A | 12/1999 | Hatwar et al. | |
| 6,007,889 A | 12/1999 | Nee | |
| 6,115,353 A | 9/2000 | Horie et al. | |
| 6,129,968 A | 10/2000 | Ogawa | |
| 6,177,166 B1 | 1/2001 | Ohno et al. | |
| 6,228,457 B1 | 5/2001 | Ueno et al. | |
| 6,232,036 B1 | 5/2001 | Suzuki et al. | |
| 6,242,068 B1 | 6/2001 | Preuss | |
| 6,245,403 B1 | 6/2001 | Spahni et al. | |
| 6,280,811 B1 | 8/2001 | Nee | |
| 6,292,457 B1 | 9/2001 | Preuss et al. | |
| 6,296,915 B1 | 10/2001 | Yusu et al. | |
| 6,351,446 B1 | 2/2002 | Weinzerl et al. | |
| 6,451,402 B1 | 9/2002 | Nee | |
| 6,469,969 B2 * | 10/2002 | Carson et al. | 369/59.12 |

(Continued)

FOREIGN PATENT DOCUMENTS

EP    0720159    7/1996

(Continued)

OTHER PUBLICATIONS

Baba, K., "Compact-Disc Compatible Wideband Write-Once Optical Disc Memories Using Multilayered Ultra-Thin Silver Films", *Electronics Letters Online No. 19970680*, (May 1, 1997).

(Continued)

*Primary Examiner*—Jennifer McNeil
*Assistant Examiner*—Daniel Miller
(74) *Attorney, Agent, or Firm*—Woodard, Emhardt, Moriarty, McNett & Henry LLP

(57) ABSTRACT

A silver-based alloy composition for use as a reflective, semi-reflective or highly reflective coatings or layer(s) for use in optical data storage media, low emissivity glass, transparent conductive displays, and electro-chromic mirrors, or other reflective, semi-reflective or highly reflective applications. The alloy compositions comprise silver with hafnium, and/or indium, and/or copper, and/or zinc, and/or silicon and/or tin.

8 Claims, No Drawings

U.S. PATENT DOCUMENTS

| | | | |
|---|---|---|---|
| 6,544,616 B2 | 4/2003 | Nee | |
| 6,764,735 B2 | 7/2004 | Nee | |
| 6,790,503 B2 | 9/2004 | Nee | |
| 2002/0034603 A1* | 3/2002 | Nee | 428/64.1 |
| 2002/0054973 A1 | 5/2002 | Weinzerl et al. | |
| 2002/0122913 A1 | 9/2002 | Nee | |
| 2003/0138591 A1 | 7/2003 | Nee | |
| 2003/0215598 A1 | 11/2003 | Nee | |
| 2004/0018334 A1 | 1/2004 | Nee | |
| 2004/0151866 A1 | 8/2004 | Nee | |
| 2004/0151867 A1 | 8/2004 | Nee | |

FOREIGN PATENT DOCUMENTS

| | | |
|---|---|---|
| EP | 0737966 | 10/1996 |
| EP | 0745985 | 12/1996 |
| EP | 0 867 868 | 9/1998 |
| EP | 0917137 | 5/1999 |
| EP | 0755052 | 11/1999 |
| JP | 57-051481 | 1/1982 |
| JP | 57-186244 | 11/1982 |
| JP | 02192046 | 5/1989 |
| JP | 03-286432 | 12/1991 |
| JP | 04-134648 | 5/1992 |
| JP | 04176039 | 6/1992 |
| JP | 04-364240 | 12/1992 |
| JP | 05-012710 | 1/1993 |
| JP | 05073975 | 3/1993 |
| JP | 05-166225 | 7/1993 |
| JP | 06-208732 | 7/1994 |
| JP | 06-274954 | 9/1994 |
| JP | 06-325408 | 11/1994 |
| JP | 07-003363 | 1/1995 |
| JP | 07-014221 | 1/1995 |
| JP | 07-050035 | 2/1995 |
| JP | 07-073527 | 3/1995 |
| JP | 07-076171 | 3/1995 |
| JP | 07-085520 | 3/1995 |
| JP | 7076171 | 3/1995 |
| JP | 07-090566 | 4/1995 |
| JP | 07-104424 | 4/1995 |
| JP | 07105575 | 4/1995 |
| JP | 07110964 | 4/1995 |
| JP | 08124213 | 5/1996 |
| JP | 08-244339 | 9/1996 |
| JP | 08297858 | 11/1996 |
| JP | 8332772 | 12/1996 |
| JP | 09-212915 | 8/1997 |
| JP | 9204690 | 8/1997 |
| JP | 9245373 | 9/1997 |
| JP | 9306029 | 11/1997 |
| JP | 08158147 | 1/1998 |
| JP | 10011799 | 1/1998 |
| JP | 10177742 | 6/1998 |
| JP | 2000-057627 | 2/2000 |
| JP | 3286432 | 5/2002 |
| JP | 2002-235130 | 8/2002 |
| WO | WO-9967084 | 12/1999 |
| WO | WO-0021079 | 4/2000 |
| WO | WO-0207919 | 1/2002 |
| WO | WO-0217919 | 1/2002 |
| WO | WO2004053861 | 6/2004 |

OTHER PUBLICATIONS

Baba, K., "Silver-Gold Compound Metal Island Films for Durable Write-Once Optical Disk Memories", *Electronics Letters Online No. 19990261*, (Feb. 17, 1999),497-498.

Baba, Kazutaka, "Write-Once Optical Data Storage Media with Large Reflectance Change with Metal-Island Films", *Applied Optics*, vol. 36, No. 11, (Apr. 10, 1997),2421-2426.

Green, E. L., "Optical Properties of the Alpha-Phase Alloys Ag-Zn and Ag-Cd", *Physical Review*, vol. 2, No. 2, (Jul. 15, 1976),330-340.

Hayashi, K., "Durable Write-Once Optical Disk Memories for 800nm Using Silver Island Films", *Electronics Letters Online No. 19951019*, (Jul. 4, 1995).

Hirota, Kusato, "Reliability of the Phase Change Optical Disk", *Jpn. J. Appl. Phys.* vol. 36, Part 1, No. 10,(Oct. 1997),6398-6402.

Kobayashi, Masanobu, "High-Corrosion-Resistant Magneto-Optical Recording Disk", *OKI Technical Review 131*, vol. 55, (Sep. 1988),33-38.

Markvoort, J. A., "Aging Properties of Optical Non-Erasable Disks", *The International Society for Optical Engineering*, (Jun. 6, 2003),134-140.

Niihara, Toshio, "High Corrosion-Resistant Magneto-Optical Film on a New Plastic Substrate", *JEEE Transactions on Magnetics*, vol. 24, No. 6, (Nov. 1988),2437-2442.

Nishimori, K., "Preparation of Magnetron-Sputtered Ag-Zn Alloy Films for an Erasable Optical-Disk", *Applied Surface Science 33/34*, (1988),1216-1221.

Tamura, Reiji, "Recording Characteristics and Reliability of Novel Writable Compast Disc Using a Au-Sn Alloy Single Layer", *Jpn. J. Appl. Phys.* vol. 32, Part 1, No. 11B, (Nov. 30, 1993),5238-5240.

* cited by examiner

REFLECTIVE OR SEMI-REFLECTIVE METAL ALLOY COATINGS

This application is a continuation-in-part of U.S. patent application Ser. No. 10/616,478, entitled "Reflective or Semi-Reflective Metal Alloy Coatings", filed on Jul. 8, 2003 which claims the priority to and the benefit of the filing of U.S. Provisional Patent Application Ser. No. 60/394,587, entitled "Metal Alloys with Reflective or Semi-Reflective Layers", filed on Jul. 8, 2002, and to International Patent Application Serial No. PCT/US03/21446, entitled "Reflective or Semi-Reflective Metal Alloy Coatings", filed on Jul. 8, 2003. This application also claims the benefit of and priority to two U.S. Provisional Patent Applications. These are: U.S. Provisional Patent Application Ser. No. 60/614,881, entitled "Reflective or Semi-Reflective Metal Alloy Coatings", filed on Sep. 29, 2004, and U.S. Provisional Patent Application Ser. No. 60/535,675, entitled "Reflective or Semi-Reflective Metal Alloy Coatings", filed on Jan. 8, 2004. The specifications and claims of all of the foregoing applications are incorporated herein by reference.

BACKGROUND OF THE INVENTION

1. Field of the Invention (Technical Field)

The present invention relates to silver-based alloy compositions for use as reflective, semi-reflective or highly reflective layers or coatings for use in optical data storage media, low emissivity glass, transparent conductive displays, electro-chromic mirrors, or other reflective or semi-reflective applications.

2. Background Art

Note that the following discussion refers to a number of publications by author(s) and year of publication, and that due to recent publication dates certain publications are not to be considered as prior art vis-à-vis the present invention. Discussion of such publications herein is given for more complete background and is not to be construed as an admission that such publications are prior art for patentability determination purposes. Each of the publications is incorporated herein by reference.

Silver and some of its alloys have been employed for many years as reflectors in thick or thin film applications. In thick film applications such as paints, they were applied to the back side of the substrate and normally laminated into an assembly. In thin films, silver has been used on both the front and back side of substrates and has been employed as a mirroring material for IR, laser and visual light applications.

In all applications, pure silver thin films required protective layers on top, or in some cases, below, to prevent degradation of the film. Silver also requires edgewise protection to inhibit corrosion at the edges in the film that slowly creep into the working surface area of the film.

Historically, gold or platinum group metals such as palladium or platinum have been added as a way of adding nobility to the silver. This has worked for many applications, but the added cost of gold or platinum group metals can increase the intrinsic raw material component of the cost by an order of magnitude or more.

Therefore, any improvements made would have to give due consideration to metal costs and the attendant handling issues.

As a manner of addressing the issues of improving performance, lowering cost, ease of manufacturing and flexibility in application, it was important to take a practical approach to selecting the alloying elements for use in the present invention. As was mentioned, the traditional alloying elements of gold, platinum and palladium, are very expensive and are difficult to recover from spent targets and associated scrap. Selecting less expensive and readily available elements that would alloy well with silver, and be readily available in the purities in passivation or inertness to the operating environment was an important step in formulating the alloys of the present invention.

There are several specialty applications in the industry that require reflective or semi-reflective coatings or layers. These include optical storage media, low emissivity glass, transparent conductive displays, and electro-chromic mirrors. The present invention provides useful alloy coating compositions for such applications, and other applications requiring reflective and semi-reflective properties.

Optical discs are commonly used for recording data, video, audio, etc. The discs are usually constructed in four layers (conventional, prerecorded, optical discs). The first layer is typically constructed from optical grade, polycarbonate resin, and manufactured by techniques well-known in the art, usually by injection or compression molding the resin into a disc. The surface of such a disc is molded or stamped with precisely located pits and lands having a predetermined size which store information on the disc.

After stamping (or molding), an optically reflective layer is disposed on the information pits and lands, which is usually between about 40 to about 100 nanometers (nm) thick. Deposition techniques such as sputtering or thermal evaporation are well-known in the art. *Kirk-Othmer, Encyclopedia of Chemical Technology*, $3^{rd}$ ed. Vol. 10, pp. 247 to 283, gives a detailed explanation of deposition techniques such as sputtering, thermal evaporation, flow discharge, ion plating, and chemical vapor deposition.

Next, a solvent-based or a UV (ultraviolet) curing-type resin is applied over the reflective layer. This third layer protects the reflective layer from handling and the ambient environment. An optional label identifies the particular information that is stored on the disc, and sometimes, may include artwork.

The information pits, found between the polycarbonate resin and the reflective layer, usually form a continuous spiral. The spiral typically begins at an inside radius and ends at an outside radius. The distance between any 2 spirals is called the "track pitch" and is usually about 1.6 microns. The length of a pit or land is from about 0.9 to about 3.3 microns. (All of these specifications were first proposed by Philips NV of Holland and Sony of Japan as standards for the industry.)

Reading of the disc is accomplished by pointing a laser beam through the optical grade polycarbonate and onto the reflective layer with sufficiently small resolution to focus on the information pits. The pits have a depth of about ¼ of the wavelength of the laser light, which has a wavelength in the range of about 780 to 820 nanometers. Destructive (dark) or constructive (bright) interference of the laser light is then produced as the laser travels along the spiral track, focusing on an alternating stream of pits and lands in its path.

This change of light intensity from dark to bright or from bright to dark forms the basis of a digital data stream of one's and zeros. When there is no light intensity change in a fixed time interval, the digital signal is "0," and when there is a light intensity change from either dark to bright or bright to dark, the digital signal is "1." The continuous stream of ones and zeros is then electronically decoded into a meaningful format, such as music.

As a result, it is important to have a highly reflective coating on the disc to reflect the laser light from the disc and onto a detector in order to read the presence of an intensity change. Typically, a reflective layer is copper, silver, aluminum, or gold, all of which have a high optical reflectivity of generally more than 80 percent. Aluminum and aluminum alloys are most commonly used given their easy placement onto a polycarbonate disc, lower cost, and corrosion resistance.

Organic dye is the key to a CD-R disc. The dye is made from solvent and organic compounds from the cyanine, phthalocyanine or azo family. It is normally applied by spin coating onto the disc. A reflective layer is then applied over the dye. Because the dye may contain halogen ions or other chemicals that can corrode the reflective layer, many commonly used reflective layer materials (e.g., aluminum) may not be suitable for use on a CD-R disc. As a result, gold is often used as the reflective layer; however it is a very expensive solution.

Another type of optical disc is a prerecorded digital video disc, "DVD." This disc comprises two halves, each made of polycarbonate resin and coated with a reflective layer, as described above. The halves are then bonded with a UV curing resin or a hot melt adhesive to form the whole disc. The disc can then be played from both sides. The size of a DVD is about the same as a CD, but the information density is higher, having a track pitch of about 0.7 micron with the length of the pits and lands from approximately 0.3 to 1.4 microns.

One variation of the DVD family of discs is the DVD-dual layer disc which has two information layers. On this disc, the highly reflectivity layer is usually the same as others, but a second layer is only semi-reflective with a reflectivity in the range of approximately 18 to 30 percent. This second layer must also allow a substantial amount of light to pass through, so that the laser beam can reach the highly reflective layer underneath and then reflect back through the semi-reflective layer to the signal detector.

Details regarding the manufacture and construction of DVD discs can be found in U.S. Pat. No. 5,640,382, entitled "Dual Layer Optical Medium Having Partially Reflecting Metal Alloy Layer," to Florezak et al., issued Jun. 17, 1997.

Additional manufacturing and operating details of an optically readable storage system can be found in U.S. Pat. No. 4,998,239, entitled "Optical Information Recording Medium Containing a Metal Alloy as a Reflective Material," to Strandjord et al., issued Mar. 5, 1991 and U.S. Pat. No. 4,709,363, entitled "Optically Readable Information Disc Having a Reflection layer Formed From a Metal Alloy," to Dirks et al., issued Nov. 24, 1987.

Another disc in the compact disc family that has become popular is the recordable compact disc or "CD-R." This disc is similar to the CD described earlier, with a few minor changes. The recordable compact disc begins with a continuous spiral groove instead of a continuous spiral of pits and has a layer of organic dye between the polycarbonate substrate and the reflective layer. The disc is recorded by periodically focusing a laser beam into the grooves as the laser travels along the spiral track. The laser heats the dye to a high temperature, which in turn places pits in the groove that coincide with an input data stream of ones and zeros by periodically deforming and decomposing the dye. Additional details can be found in U.S. Pat. No. 5,325,351, entitled "Optical Recording Medium Having a Reflective Layer Made of Cu—Ag or Cu—Au Alloy," to Uchiyama et al., issued Jun. 28, 1994; U.S. Pat. No. 5,391,462 issued Feb. 21, 1995, U.S. Pat. No. 5,414,914 issued May. 16, 1995 and U.S. Pat. No. 5,419,939 issued May 39, 1995, entitled "Optical Recording Disk," to Arioka et al.; and U.S. Pat. No. 5,620,767, entitled "Light Reflecting and Heat Dissipating Material and Optical Information Recording Medium Using the Same," to Harigaya et al., issued Apr. 15, 1997.

The typical choice of a semi-reflective layer is gold or silicon in the thickness range of 5 to 70 nanometers, as discussed in U.S. Pat. No. 5,171,392, to Lida et al. Gold, when sufficiently thin, will both reflect and transmit light, has outstanding corrosion resistance, is relatively easy to sputter into a coating of uniform thickness, and is more expensive than other metals. Silicon is a reasonable alternative to gold, but because it is a semiconductor, its sputtering yield and sputtering rate is significantly lower than gold. Silicon also has a tendency to react with oxygen and nitrogen during sputtering. Nevertheless, silicon is useful as an optional component in the alloy of the present invention.

Generally, for aesthetic reasons, a gold or copper based alloy is used to offer the consumer a "gold" colored disc. Although gold naturally offers this rich color and satisfies all the functional requirements of a highly reflective layer, it is more expensive than aluminum. Examples of patents disclosing such gold alloys are: U.S. Pat. No. 5,093,174, entitled "Optical Recording Medium," to Suzuki et al., issued Mar. 3, 1992, which discloses a metal reflecting layer of an aluminum or silver alloy containing gold for optical recording media; U.S. Pat. No. 6,292,457 B1, entitled "Recordable Optical Media With A Silver-Gold Reflective Layer," to Preuss et al., issued Sep. 18, 2001, which discloses an optical recording media having a transparent substrate and a reflective layer containing gold; U.S. Pat. No. 6,007,889, issued Dec. 28, 1998; U.S. Pat. No. 6,280,881, issued Aug. 28, 2001; U.S. Pat. No. 6,541,402, issued Sep. 17, 2002; and U.S. Pat. No. 6,544,616 issued Apr. 8, 2003; and U.S. Patent Application Nos. US2002/0034603 filed Apr. 13, 2001 and US2002/0122913 filed Sep. 5, 2002, entitled "Metal Alloys for the Reflective or Semi-Reflective Layer of An Optical Storage Medium," to Nee, which disclose a silver-based or copper-based alloy thin film for a coating layer for optical discs. The Nee additions to the silver alloy are gold, palladium, copper, rhodium, ruthenium, osmium, iridium, platinum, zinc, aluminum, zinc plus aluminum, manganese, and germanium. The Nee additions to the copper alloy are manganese, silver, cadmium, gold, magnesium, aluminum, beryllium, zirconium and nickel. These patents and applications do not disclose the alloy coatings of the present invention.

Other expensive materials, such as palladium have also been used in the art to produce optical storage media, such as disclosed in: U.S. Pat. No. 6,228,457 B1, entitled "Optical Data Storage Medium," to Ueno et al., issued May 8, 2001, which discloses an optical data storage medium with a silver-palladium-copper alloy or silver-palladium-titanium alloy; and U.S. Pat. No. 6,242,068, entitled "Recordable Optical Media with a Silver-Palladium Reflective Layer," to Preuss, issued Jun. 3, 2001, which discloses a reflective layer made of silver and palladium. The patents do not disclose the alloy coatings of the present invention.

A copper-based alloy that contains aluminum, zinc or tin is sometimes used to produce a "gold" looking layer. However, alloys of copper corrode more easily than aluminum.

U.S. Pat. No. 6,351,446, issued Feb. 26, 2003, and U.S. Patent Application No. US2002/0054973, filed Nov. 26, 2001, entitled "Optical Data Storage Disk," to Weinzerl, disclose an optical data storage disk with at least two interfaces. The inner layer is the reflection layer and the other layer is a partially reflecting/partially transmitting layer. The inner layer is made of one type of alloy and the other layer is made of another alloy. The Weinzerl patent and application do not disclose the alloy coatings of the present invention.

Several silver-based alloys have been developed to improve tarnish resistance in multi-layer stacks. Although silver-based alloys are commonly used in the casting industry (e.g. for jewelry making), they have not heretofore been utilized as reflective or semi-reflective coatings for specialty applications, including, but not limited to, optical storage media, low emissivity glass, transparent conductive displays, electro-chromic mirrors, and other reflective or semi-reflective applications. As indicated above, these silver-based alloys have typically included gold or palladium, very expensive components. These alloys traditionally have had 80% to 95% silver and employed gold or platinum group metals as alloying elements to stabilize the properties of the silver when exposed to moisture or mildly acidic environments.

The present invention is a new, lower cost alloy coating, specifically useful for optical storage media, low emissivity glass, transparent conductive displays, electro-chromic mirrors, reflective applications, semi-reflective applications and highly reflective applications that represent a favorable balance between cost and performance. The preferred alloy of the present invention is more complex than the standard binary or ternary alloys presently known in the art, however, it can be produced using readily available production equipment.

BRIEF SUMMARY OF THE INVENTION

The present invention relates to a reflective (including highly reflective) or semi-reflective coating for optical storage media, low emissivity glass, transparent conductive displays, electro-chromic mirrors, and other reflective, semi-reflective or highly reflective coating applications. A preferred alloy coating comprises silver and indium, and may also have one or more of copper, zinc, silicon and/or tin, or any combination thereof. A second preferred alloy coating comprises silver, indium, tin, and silicon. A silver/hafnium binary alloy is the most preferred composition, the hafnium may be replaced, in whole or in part, with other components, including but not limited to copper, zinc, silicon, tin, and indium. Another preferred alloy comprises silver, copper, zinc, tin or silicon, or any combination thereof.

One preferred alloy coating is made of between approximately 45% by weight and approximately 99.9% by weight of silver, between approximately 0.01% by weight and approximately 55% by weight copper, between approximately 0.01% by weight and approximately 55% by weight zinc, between approximately 0.01% by weight and approximately 30% by weight tin, and between approximately 0.01% by weight and approximately 30% by weight silicon. More preferably, the alloy coating comprises between approximately 55% by weight and approximately 95% by weight silver, between approximately 0.01% by weight and approximately 10% by weight copper, between approximately 0.01% by weight and approximately 10% by weight zinc, between approximately 0.01% by weight and approximately 10% by weight tin, and between approximately 0.01% by weight and approximately 10% by weight silicon. Most preferably, the composition of the alloy coating comprises between approximately 90% by weight and approximately 95% by weight silver, between approximately 0.25% by weight and approximately 5% by weight copper, between approximately 0.25% by weight and approximately 5% by weight zinc, between approximately 0.01% by weight and approximately 2% by weight tin, and between approximately 0.01% by weight and approximately 1% by weight silicon. In any of the above compositions, silicon and/or tin may optionally be replaced in whole or in part by indium.

Another preferred embodiment of the alloy coating comprises between approximately 97% and 99% by weight silver; between approximately 0.5% and 2% by weight copper; between approximately 0.1% and 1% by weight zinc; between approximately 0.1% and 0.5% by weight tin; and between approximately 0.1% and 0.5% by weight silicon.

A preferred alloy coating comprises between approximately 94% and 96% by weight silver; between approximately 2% and 3% by weight copper; between approximately 1% and 2% by weight zinc; between approximately 0.1% and 1% by weight tin; and between approximately 0.1% and 0.5% by weight silicon.

The preferred silver/indium alloy compositions preferably comprise at least silver and indium and any or all of the following components in the following ranges: between approximately 85% and 99.9% by weight silver, between approximately 0.01% and 30% by weight indium, between approximately 0.01% and 30% by weight tin, and between approximately 0.01% and 30% silicon. More preferably, the composition of the alloy coating comprises between approximately 90% and 99% by weight silver, between approximately 0.01% and 15% by weight indium, between approximately 0.01% and 10% by weight tin, and between approximately 0.01% and 10% silicon. Most preferably, the composition of the alloy coating comprises between approximately 95% and 98.5% by weight silver, between approximately 0.01% and 12% by weight indium, between approximately 0.01% and 2% by weight tin, and between approximately 0.01% and 1% silicon. Another embodiment comprises an alloy where silicon comprises between approximately 0.05% by weight and approximately 0.2% by weight of silicon.

A preferred alloy for a reflective coating comprises the following composition ranges: between approximately 90% and 95% by weight silver, between approximately 3% and 6% by weight copper, between approximately 1% and 3% by weight zinc, between approximately 0.1% and 1% by weight tin, and 0.1% and 0.2% indium.

Another preferred alloy coating comprises between approximately 80% by weight and approximately 99% by weight silver; and more preferably between approximately 85% by weight and approximately 99.9% by weight silver; between approximately 0.01% by weight and between approximately 15% by weight indium; between approximately 0.05% by weight and between approximately 10.0% by weight tin; and between approximately 0.01% by weight and between approximately 0.75% silicon.

A preferred alloy coating comprises silver, indium, tin, and silicon in the following ranges from preferred to most preferable: indium is in an amount of between approximately 0.01% by weight and approximately 15.0% by weight; indium is in an amount of between approximately 0.1% by weight and approximately 10% by weight; indium is in an amount of between approximately 1.0% by weight and approximately 2.0% by weight; tin in an amount of between approximately 0.05% by weight and approximately 10% by weight; tin is between approximately 0.1% by weight and approximately 3% by weight; tin is between approximately 0.25% by weight and approximately 1.0% by weight; silicon in an amount of between approximately 0.01% by weight and approximately 0.75% by weight; silicon in an amount of between approximately 0.05% by weight and approximately 0.5% by weight; silicon in an amount of between approximately 0.05% by weight and approximately 0.2% by weight.

A preferred alloy coating comprises between approximately 94% and 96% by weight silver; between approximately 2% and 3% by weight copper; between approximately 1% and 2% by weight zinc; between approximately 0.1% and 1% by weight tin; and between approximately 0.1% and 0.5% by weight silicon. More preferably, the coating comprises between approximately 97% and 99% by weight silver; between approximately 0.5% and 2% by weight copper; between approximately 0.1% and 1% by weight zinc; between approximately 0.1% and 0.5% by weight tin; and between approximately 0.1% and 0.5% by weight silicon.

A preferred silver/indium alloy comprises silver, indium, tin and silicon in the ranges set forth above. Another preferred silver/indium alloy comprises silver, indium, copper, zinc and tin in the preferred ranges from preferred to most preferable as set forth below: indium is in an amount of between approximately 0.01% by weight and approximately 15.0% by weight; indium is in an amount of between approximately 0.1% by weight and approximately 10% by weight; indium is in an amount of between approximately 1.0% by weight and approximately 2.0% by weight; tin in an amount of between approximately 0.05% by weight and approximately 10% by weight; tin is between approximately 0.1% by weight and approximately 3% by weight; tin is between approximately 0.25% by weight and approximately 1.0% by weight; silicon in an amount of between approximately 0.01% by weight and approximately 0.75% by weight; silicon in an amount of between approximately 0.05% by weight and approximately 0.5% by weight; silicon in an amount of between approximately 0.05% by weight and approximately 0.2% by weight.

A silver/hafnium binary alloy is the preferred composition. However, the hafnium may be replaced, in whole or in part, with other components, including but not limited to, copper, zinc, silicon, tin, and indium.

The preferred silver/hafnium binary alloy comprises the following ranges from preferred to most preferable: silver is in an amount of between approximately 85% by weight and approximately 99.9% by weight; silver is in an amount of between approximately 90% by weight and approximately 99% by weight; silver is in an amount of between approximately 95% by weight and approximately 99% by weight; hafnium is between approximately 0.01% by weight and approximately 15.0% by weight; hafnium is between approximately 1.0% by weight and approximately 10% by weight; hafnium is between approximately 1.0% by weight and approximately 5.0% by weight.

The most preferred silver/hafnium alloy comprises approximately 98% silver and approximately 2.0% hafnium.

The present invention also relates to a method for physical deposition of the reflective, semi-reflective or highly reflective alloy coating, onto a substrate or surface. This method comprises providing a coating alloy comprising silver and/or hafnium, and/or indium, and/or zinc and copper and/or silicon and/or tin and physically depositing the coating on the substrate or surface. The method of physically depositing utilizes at least one known deposition technique including, but not limited to, sputtering, thermal evaporation, physical vapor deposition, electrolytic plating, and electroless plating.

A primary object of the present invention is to provide a silver-based alloy that is readily available in the purities required and provides technical benefits in passivation or inertness to the operating environment.

A primary advantage of the present invention is improved performance, lower cost, ease in manufacturing, and increased flexibility in application of reflective and semi-reflective coatings for specialty applications, including, but not limited to, optical storage media, low emissivity glass, transparent conductive displays, electro-chromic mirrors, and other reflective applications.

Another advantage is that the alloy coatings of the present invention are suitable for both fully reflective and semi-transparent layers.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

DESCRIPTION OF THE PREFERRED
EMBODIMENTS (BEST MODES FOR
CARRYING OUT THE INVENTION)

The present invention comprises a silver-based alloy thin film or coating for use in a reflective, highly reflective, or semi-reflective application, including, but not limited to, optical storage media, low emissivity glass, transparent conductive displays, electro-chromic mirrors (e.g. architectural glass, automotive glass, mirrors, display, electrochromics, and the like), and other reflective applications. The silver-based alloys of the invention have moderate to high reflectivity properties and are reasonably corrosion-resistant in a typical ambient environment. The term "reflective," as used throughout the specification and claims, is intended to include reflective, semi-reflective, semi-transparent or highly reflective properties. The coatings may be a single layer or multiple layers. The coatings may be deposited on a surface.

A preferred alloy coating comprises silver and indium, and may also have one or more of copper, zinc, silicon and/or tin, or any combination thereof. A second preferred alloy coating comprises silver, indium, tin, and silicon. A silver/hafnium binary alloy is the most preferred composition, the hafnium may be replaced, in whole or in part, with other components, including but not limited to copper, zinc, silicon, tin, and indium. Another preferred alloy comprises silver, copper, zinc, tin or silicon, or any combination thereof.

One preferred alloy coating is made of between approximately 45% by weight and approximately 99.9% by weight of silver, between approximately 0.01% by weight and approximately 55% by weight copper, between approximately 0.01% by weight and approximately 55% by weight zinc, between approximately 0.01% by weight and approximately 30% by weight tin, and between approximately 0.01% by weight and approximately 30% by weight silicon. More preferably, the alloy coating comprises between approximately 55% by weight and approximately 95% by weight silver, between approximately 0.01% by weight and approximately 10% by weight copper, between approximately 0.01% by weight and approximately 10% by weight zinc, between approximately 0.01% by weight and approximately 10% by weight tin, and between approximately 0.01% by weight and approximately 10% by weight silicon. Most preferably, the composition of the alloy coating comprises between approximately 90% by weight and approximately 95% by weight silver, between approximately 0.25% by weight and approximately 5% by weight copper, between approximately 0.25% by weight and approximately 5% by weight zinc, between approximately 0.01% by weight and approximately 2% by weight tin, and between approximately 0.01% by weight and approximately 1% by weight silicon. In any of the above compositions, silicon and/or tin may optionally be replaced in whole or in part by indium.

An alloy coating was made comprising between approximately 97% and 99% by weight silver; between approximately 0.5% and 2% by weight copper; between approximately 0.1% and 1% by weight zinc; between approximately 0.1% and 0.5% by weight tin; and between approximately 0.1% and 0.5% by weight silicon.

An alloy coating was made comprising between approximately 94% and 96% by weight silver; between approximately 2% and 3% by weight copper; between approximately 1% and 2% by weight zinc; between approximately 0.1% and 1% by weight tin; and between approximately 0.1% and 0.5% by weight silicon.

The preferred silver/indium alloy compositions preferably comprise at least silver and indium and any or all of the following components in the following ranges: between approximately 85% and 99.9% by weight silver, between approximately 0.01% and 30% by weight indium, between approximately 0.01% and 30% by weight tin, and between approximately 0.01% and 30% silicon. More preferably, the composition of the alloy coating comprises between approximately 90% and 99% by weight silver, between approximately 0.01% and 15% by weight indium, between approximately 0.01% and 10% by weight tin, and between approximately 0.01% and 10% silicon. Most preferably, the composition of the alloy coating comprises between approximately 95% and 98.5% by weight silver, between approximately 0.01% and 12% by weight indium, between approximately 0.01% and 2% by weight tin, and between approximately 0.01% and 1% silicon. Another embodiment comprises an alloy where silicon comprises between approximately 0.05% by weight and approximately 0.2% by weight of silicon.

A preferred alloy for a reflective coating was made having the composition ranges: between approximately 90% and 95% by weight silver, between approximately 3% and 6% by weight copper, between approximately 1% and 3% by weight zinc, between approximately 0.1% and 1% by weight tin, and 0.1% and 0.2% indium.

Another preferred alloy coating comprises between approximately 80% by weight and approximately 99% by weight silver; and more preferably between approximately 85% by weight and approximately 99.9% by weight silver; between approximately 0.01% by weight and between approximately 15% by weight indium; between approximately 0.05% by weight and between approximately 10.0% by weight tin; and between approximately 0.01% by weight and between approximately 0.75% silicon.

A preferred alloy coating comprises silver, indium, tin, and silicon in the following ranges from preferred to most preferable: indium is in an amount of between approximately 0.01% by weight and approximately 15.0% by weight; indium is in an amount of between approximately 0.1% by weight and approximately 10% by weight; indium is in an amount of between approximately 1.0% by weight and approximately 2.0% by weight; tin in an amount of between approximately 0.05% by weight and approximately 10% by weight; tin is between approximately 0.1% by weight and approximately 3% by weight; tin is between approximately 0.25% by weight and approximately 1.0% by weight; silicon in an amount of between approximately 0.01% by weight and approximately 0.75% by weight; silicon in an amount of between approximately 0.05% by weight and approximately 0.5% by weight; silicon in an amount of between approximately 0.05% by weight and approximately 0.2% by weight.

A preferred alloy coating comprises between approximately 94% and 96% by weight silver; between approximately 2% and 3% by weight copper; between approximately 1% and 2% by weight zinc; between approximately 0.1% and 1% by weight tin; and between approximately 0.1% and 0.5% by weight silicon. More preferably, the coating comprises between approximately 97% and 99% by weight silver; between approximately 0.5% and 2% by weight copper; between approximately 0.1% and 1% by weight zinc; between approximately 0.1% and 0.5% by weight tin; and between approximately 0.1% and 0.5% by weight silicon.

A silver/hafnium binary alloy is the preferred composition. However, the hafnium may be replaced, in whole or in part, with other components, including but not limited to copper, zinc, silicon, tin, and indium.

A preferred silver/indium alloy comprises silver, indium, tin and silicon in the ranges set forth above. Another preferred silver/indium alloy comprises silver, indium, copper, zinc and tin in the preferred ranges from preferred to most preferable as set forth below: indium is in an amount of between approximately 0.01% by weight and approximately 15.0% by weight; indium is in an amount of between approximately 0.1% by weight and approximately 10% by weight; indium is in an amount of between approximately 1.0% by weight and approximately 2.0% by weight; tin in an amount of between approximately 0.05% by weight and approximately 10% by weight; tin is between approximately 0.1% by weight and approximately 3% by weight; tin is between approximately 0.25% by weight and approximately 1.0% by weight; silicon in an amount of between approximately 0.01% by weight and approximately 0.75% by weight; silicon in an amount of between approximately 0.05% by weight and approximately 0.5% by weight; silicon in an amount of between approximately 0.05% by weight and approximately 0.2% by weight.

The preferred silver/hafnium binary alloy comprises the following ranges from preferred to most preferable: silver is in an amount of between approximately 85% by weight and approximately 99.9% by weight; silver is in an amount of between approximately 90% by weight and approximately 99% by weight; silver is in an amount of between approximately 95% by weight and approximately 99% by weight; hafnium is between approximately 0.01% by weight and approximately 15.0% by weight; hafnium is between approximately 1.0% by weight and approximately 10% by weight; hafnium is between approximately 1.0% by weight and approximately 5.0% by weight.

The most preferred silver/hafnium alloy comprises approximately 98% silver and approximately 2.0% hafnium.

Any of the embodiments described herein may be further modified by adding any other suitable material(s) having an intrinsic reflectivity of approximately greater than 80 percent.

Having presented some of the preferred compositions for the starting materials, it is important to recognize that both the manufacturing process of the sputtering target and the process to deposit the target into a thin film play important roles in determining the final properties of the film.

The alloy of the present invention can be produced using traditional casting/rolling and annealing techniques using current equipment.

The following is a description of the manufacture of optical discs or targets upon which the alloy coatings of the present invention may be disposed. In general, vacuum melting and casting of the substrate or target material or alloys or melting and casting under protective atmosphere, are preferred to minimize the introduction of other unwanted impurities.

Afterwards, the as-cast ingot should undergo a cold working process to break down the segregation and the nonuniform as-cast microstructure. One preferred method is cold forging or cold uniaxial compression with more than 50 percent of size reduction, followed by annealing to recrystallize the deformed material into fine equi-axed grain structure with a preferred texture of <1,1,0> orientation. This texture promotes directional sputtering in a sputtering apparatus so that more of the atoms from the sputtering target are deposited onto the disc substrates for more efficient use of the target material.

Alternatively, a cold multi-directional rolling process of more than 50 percent size reduction can be employed, followed by annealing to promote a random oriented microstructure in the target and finally by machining to the final shape and size suitable for a given sputtering apparatus. This target with random crystal orientation leads to a more random ejection of atoms from the target during sputtering and a more uniform thickness distribution in the disc substrate.

Depending on different discs' optical and other system requirements, either a cold forging or a cold multi-directional rolling process can be employed in the target manufacturing process to optimize the optical and other performance requirements of the thin film for a given application.

Sputtering, thermal evaporation or physical vapor deposition, and possibly electrolytic or electroless plating processes are useful in accordance with the present invention. Depending on the method of application, the alloy thin film's reflectivity can vary. Any application method that adds impurities to or changes the surface morphology of the thin film layer on the disc can lower the reflectivity of the layer. The reflectivity of the thin film layer on the optical disc is primarily determined by the starting material of the sputtering target, evaporation source material, or the purity and composition of the electrolytic and electroless plating chemicals.

The reflective layer of the coating of the present invention can also be used for optical discs that use a reading laser of a shorter wavelength, for example, when the reading laser's wavelength is shorter than 650 nanometers.

If the reflective film is reduced to a thickness of approximately 5 to 20 nanometers, a semi-reflective film layer can be formed from the alloy coatings of the present invention that have sufficient light transmittance for use in DVD dual-layer applications.

The alloy coatings of the present invention are particularly useful as a semi-transparent layer. The reflectivity approaches gold in the infrared spectrum making the alloy of the present invention suitable for replacement as gold (but at a lower cost), as a replacement for silver alloys (but with improved corrosion resistance), and as a replacement for indium tin oxide (due to improved sputter rate). In the visible spectrum, the alloy of the present invention is useful as a replacement for gold and higher cost silver alloys (due to a lower cost). The chemical stability, and high reflectivity are comparable, and cost effectiveness is superior to prior art alloys that utilize higher cost materials and/or processes (e.g. use of an additional "overcoat" layer to protect the silver).

The preferred alloy coating of the present invention has a uniform fine grain, preferably <50 microns.

INDUSTRIAL APPLICABILITY

The invention is further illustrated by the following non-limiting examples.

EXAMPLE 1

An alloy coating for an optical disc media was made having the composition: 92.70% silver, 4.50% copper, 2.15% zinc, 0.50% tin, and 0.15% silicon. This alloy coating was found to have superior reflective and semi-reflective qualities over other alloys, at a lower cost.

EXAMPLE 2

The above described alloy coating was compared in sputter tests, reflectance, and resistivity against existing alloys.

Optical Properties—Reflectivity

The principle application of the alloy of the present invention is useful as a replacement for silver and/or gold and their alloys in visible or infrared reflecting thin films. Therefore the focus was to compare the reflectivity against these materials. Table 1 shows the reflectivity properties of the alloys tested against both silver and gold standards. The sputtering tests were carried out on standard quartz medical slides and on web plastic. The coatings were made in a 27" wide web coater using a 10 kW power supply. The slides were placed upon the cooling drum and sputtered in a static position. Reflectivity in the ultraviolet, visible and near infrared ranges was measured with a spectrophotometer. Far infrared testing was conducted using an infrared spectrophotometer. All measurements made were in reference to aluminum standards.

TABLE 1

Comparison of Reflectivity

| Percent - Compared to Aluminum Wavelength (nm) | Alloy of the Present Invention | 99.95% Pure Ag | 99.95% Pure 15% Au | 85% Ag-7% Au | 93% Ag-Pd |
|---|---|---|---|---|---|
| 304 | 9.94 | 10 | 42 | — | — |
| 404 | 80 | 105 | 42 | 96 | 93 |
| 504 | 97 | 108 | 64 | 104 | 101 |
| 604 | 102 | 110 | 102 | 107 | 106 |
| 704 | 107 | 112 | 109 | 110 | 111 |
| 804 | 114 | 117 | 116 | 115 | 117 |
| 904 | 107 | 110 | 110 | 106 | 108 |
| 1004 | 103 | 106 | 104 | 102 | 104 |
| 1104 | 102 | 104 | 103 | 101 | 103 |
| 1204 | 101 | 103 | 102 | 100 | 102 |
| 1304 | 101 | 103 | 102 | 100 | 102 |
| 1404 | 101 | 102 | 101 | 99 | 102 |
| 1504 | 100 | 102 | 101 | 99 | 102 |
| 1604 | 100 | 102 | 101 | 99 | 102 |
| 1704 | 100 | 102 | 101 | 99 | 101 |
| 1804 | 100 | 102 | 101 | 99 | 101 |
| 1904 | 100 | 101 | 101 | 99 | 101 |
| 2004 | 100 | 101 | 101 | 99 | 101 |
| 2104 | 100 | 101 | 101 | 99 | 101 |
| 2194 | 100 | 101 | 101 | 99 | 101 |

Optical Properties—Absorptance & Emittance

Each of the sputtered films was evaluated for absorptance and emittance properties for comparison versus pure silver and pure gold. Pure silver and pure gold are employed in architectural, aerospace and automotive glass applications, so these properties were of interest. The tests were conducted using standard ASTM tests on unprotected films in the as-sputtered and after environmental testing. The results are shown in Tables 2 and 3. The following standards were used:

Solar absorptance measurements: E903

Emittance measurements: E408

Environmental aging tests: D1735

Adhesion tests: D3359

TABLE 2

Absorptance, Emittance & Adhesion

| Metal/Alloy (weight %) | Solar Absorptance | Emittance | Adhesion |
|---|---|---|---|
| Alloy of the Present Invention | .10 | .04 | Good very slight removal |
| 85% Ag-15% Au | .07 | .04 | Good |
| 93% Ag-7% Pd | .06 | .05 | Good |
| Pure Au 99.95% | .19 | .06 | Good |
| Pure Ag 99.95% | .03 | .03 | OK |

TABLE 3

Absorptance, Emittance & Adhesion After Aging

| Metal/Alloy (weight %) | Solar Absorptance | Emittance | Adhesion |
|---|---|---|---|
| Alloy of the Present Invention | .11 | .05 | Good very slight removal |
| 85% Ag-15% Au | .06 | .04 | Good |
| 93% Ag-7% Pd | .09 | .05 | Good |
| Pure Au 99.95% | .20 | .06 | Good |
| Pure Ag 99.95% | .05 | .03 | OK |

Electrical Properties

Sputter Rate and Sheet Resistance

Silver alloys are employed in transparent conductive films due to their excellent conductivity. Typically the silver layers are part of an oxide-metal-oxide film stack to optimize the optical properties and isolate the metal film. Table 4 provides the sheet resistance values for each of alloys tested and compared to gold and silver standards. The targets were sputtered with a 4 kW power supply that provided an average power density of 44 W/in$^2$. All materials were sputtered in an argon atmosphere with a flow rate of 250 sccm at a sputtering pressure of $1.0 \times 10^{-3}$ torr. Note that the films were thick; on the order of 1500 Å. This was done to provide good average sputter rates and also to eliminate substrate effect for sheet resistance measurements. A thicker coating would also provide more interfacial stress in the film and make the adhesion test more relevant.

TABLE 4

Sputter Rate and Sheet Resistance

| Metal/Alloy (weight %) | Nominal Thickness (Å) | Sputter Rate (Å/sec.) | Sheet Resistance (Ω/□) |
|---|---|---|---|
| Alloy of the Present Invention | 1425 | 194 | .55 |
| 85% Ag-15% Au | 1454 | 215 | .60 |
| 93% Ag-7% Pd | 1533 | 233 | .45 |
| Pure Au 99.95% | 1584 | 174 | .60 |
| Pure Ag 99.95% | 1344 | 232 | .32 |

The results show that the alloy coating of the present invention replaces more expensive or less corrosion resistant materials in some applications. The properties for the alloy of the present invention in several key areas of interest to the thin film engineer show good concurrence with the ranges of the more expensive materials.

EXAMPLE 3

An alloy coating was made comprising between approximately 94% and 96% by weight silver; between approximately 2% and 3% by weight copper; between approximately 1% and 2% by weight zinc; between approximately 0.1% and 1% by weight tin; and between approximately 0.1% and 0.5% by weight silicon. Specifically, the preferred alloy comprised approximately: 95.20% silver, 2.27% copper, 1.85% zinc, 0.50% tin, and 0.18% silicon by weight. This alloy coating was also found to have superior reflective and semi-reflective qualities over other alloys, at a lower cost.

EXAMPLE 4

An alloy coating was made comprising between approximately 97% and 99% by weight silver; between approximately 0.5% and 2% by weight copper; between approximately 0.1% and 1% by weight zinc; between approximately 0.1% and 0.5% by weight tin; and between approximately 0.1% and 0.5% by weight silicon. Specifically, the preferred alloy comprised approximately: 98.20% silver, 1.00% copper, 0.45% zinc, 0.25% tin, and 0.10% silicon by weight.

EXAMPLE 5

A preferred alloy for a reflective coating was made having the composition ranges: between approximately 90% and 95% by weight silver, between approximately 3% and 6% by weight copper, between approximately 1% and 3% by weight zinc, between approximately 0.1% and 1% by weight tin, and 0.1% and 0.2% indium. Specifically, the preferred alloy comprised approximately: 92.70% silver, 4.50% copper, 2.15% zinc, 0.50% tin, and 0.15% indium by weight.

EXAMPLE 6

In a related preferred embodiment of the present invention, silver is alloyed with indium, tin, and silicon. Such alloys, although possibly softer, exhibit good corrosion resistance and high visible light reflection. Advantages include but are not limited to: a reduced alloy volatility (since indium has a much lower vapor pressure than zinc), resulting in a cleaner film which more closely conforms to the starting chemistry; indium has a high compatibility with other layers in the disc, such as those comprising indium tin oxide or tin oxide; more durability and chemical resistance due to the elimination of copper; and easier melting and processing due to the low melting point of indium.

These alloy coatings preferably comprise between approximately 85% by weight and approximately 99.9% by weight silver, between approximately 0.01% by weight and approximately 15.0% by weight indium, between approximately 0.05% by weight and approximately 10% by weight tin, and between approximately 0.01% by weight and approximately 0.75% by weight silicon.

More preferably, alloy coatings comprise between approximately 90% by weight and approximately 99% by weight silver, between approximately 0.1% by weight and approximately 10% by weight indium, between approximately 0.1% by weight and approximately 3.0% by weight tin, and between approximately 0.05% by weight and approximately 0.5% by weight silicon.

Most preferably, the alloys comprise between approximately 95% by weight and approximately 98.5% by weight silver, between approximately 1.0% by weight and approximately 2.0% by weight indium, between approximately 0.25% by weight and approximately 1.0% by weight tin, and between approximately 0.05% by weight and approximately 0.2% by weight silicon.

Specific examples of such alloys are as follows. Preferred alloy coatings were made having the following compositions (in weight percent):

1) 98% silver, 1.4% indium, 0.50% tin, and 0.10% silicon;
2) 97.2% silver, 1.85% indium, 0.85% tin, and 0.10% silicon;
3) 92.7% silver, 6.65% indium, 0.50% tin, and 0.15% silicon;
4) 92.7% silver, 2.15% indium, 5% tin, 0.15% silicon;
5) 88.07% silver, 11.31% indium, 0.47% tin, 0.14% silicon;
6) 87.85% silver, 3.58% indium, 8.44% tin, 0.14% silicon.

EXAMPLE 7

In a most preferred embodiment of the present invention, silver is alloyed with hafnium. Hafnium imparts a sacrificial barrier layer of hafnium compounds that react to air.

These alloy coatings preferably comprise between approximately 85% by weight and approximately 99.9% by weight silver, and between approximately 0.01% by weight and approximately 15% by weight hafnium.

More preferably, alloy coatings comprise between approximately 90% by weight and approximately 99% by weight silver, and between approximately 1.0% by weight and approximately 10% by weight hafnium.

Most preferably, the alloys comprise between approximately 95% by weight and approximately 99% by weight silver, between approximately 1.0% by weight and approximately 5.0% by weight hafnium.

A specific example of the most preferred alloy composition is as follows. An alloy coating was made having the composition (in weight percent): approximately 98% silver and approximately 2.0% hafnium.

Although a silver/hafnium binary alloy is the preferred composition, the hafnium may be replaced, in whole or in part, with other components, including but not limited to copper, zinc, silicon, tin, and indium.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above, and of the corresponding application(s), are hereby incorporated by reference.

What is claimed is:

1. An optical storage medium including a coating, said coating comprising an alloy comprising:

silver; and hafnium;

wherein said coating is a semi-reflective and semi-transparent coating proximate a first information layer having stored information therein in the form of a molded or stamped first data pit pattern, wherein said coating forms a layer in said optical storage medium; and wherein said optical storage medium further comprises a highly-reflective coating proximate a second information layer having stored information therein in the form of a molded or stamped second data pit pattern.

2. The medium of claim 1, wherein said silver is in an amount of between approximately 85% by weight and approximately 99.9% by weight.

3. The medium of claim 2, wherein said silver is in an amount of between approximately 90% by weight and approximately 99% by weight.

4. The medium of claim 3, wherein said silver is in an amount of between approximately 95% by weight and approximately 99% by weight.

5. The medium of claim 1, wherein said hafnium is between approximately 0.01% by weight and approximately 15.0% by weight.

6. The medium of claim 5, wherein said hafnium is between approximately 1.0% by weight and approximately 10% by weight.

7. The medium of claim 6, wherein said hafnium is between approximately 1.0% by weight and approximately 5.0% by weight.

8. The medium of claim 7, comprising approximately 98% silver and approximately 2.0% hafnium.

* * * * *

UNITED STATES PATENT AND TRADEMARK OFFICE
CERTIFICATE OF CORRECTION

PATENT NO. : 7,572,517 B2  Page 1 of 1
APPLICATION NO. : 11/032636
DATED : August 11, 2009
INVENTOR(S) : George M. Wityak It is certified that error appears in the above-identified patent and that said Letters Patent is hereby corrected as shown below:

In Column 12, lines 29-35, Table 1's column headings need to be changed from

| Percent – Compared to Aluminum Wavelength (nm) | Alloy of the Present Invention | 99.95% Pure Ag | 99.95% Pure 15% Au | 85% Ag - 7% Au | 93% Ag - Pd |
|---|---|---|---|---|---|

--to--

| Percent – Compared to Aluminum Wavelength (nm) | Alloy of the Present Invention | 99.95% Pure Ag | 99.95% Pure Au | 85% Ag - 15% Au | 93% Ag - 7% Pd |
|---|---|---|---|---|---|

Signed and Sealed this

Thirteenth Day of October, 2009

David J. Kappos
*Director of the United States Patent and Trademark Office*